United States Patent
Schaefer et al.

(10) Patent No.: US 8,343,629 B2
(45) Date of Patent: *Jan. 1, 2013

(54) FLUOROPOLYMER-SILICON COMPOUNDS AND METHOD FOR PRODUCTION

(75) Inventors: Oliver Schaefer, Burghausen (DE); Peter Randel, Altusried (DE)

(73) Assignee: Wacker Chemie AG, Munich (DE)

( * ) Notice: Subject to any disclaimer, the term of this patent is extended or adjusted under 35 U.S.C. 154(b) by 352 days.

This patent is subject to a terminal disclaimer.

(21) Appl. No.: 12/738,689

(22) PCT Filed: Oct. 16, 2008

(86) PCT No.: PCT/EP2008/063954
§ 371 (c)(1),
(2), (4) Date: Apr. 19, 2010

(87) PCT Pub. No.: WO2009/053304
PCT Pub. Date: Apr. 30, 2009

(65) Prior Publication Data
US 2010/0233489 A1   Sep. 16, 2010

(30) Foreign Application Priority Data
Oct. 22, 2007   (DE) .................. 10 2007 000 553

(51) Int. Cl.
*B32B 27/40* (2006.01)
*B29C 47/06* (2006.01)

(52) U.S. Cl. ............... 428/421; 428/423.1; 428/422; 264/173.16

(58) Field of Classification Search ............ 428/422, 428/423.1, 424.2, 421; 264/173.16
See application file for complete search history.

(56) References Cited

U.S. PATENT DOCUMENTS

| 7,026,424 | B2 | 4/2006 | Schäfer et al. | |
| 7,153,924 | B2 * | 12/2006 | Kuepfer et al. | 528/44 |
| 8,076,002 | B2 * | 12/2011 | Ochs et al. | 428/429 |
| 2004/0210024 | A1 | 10/2004 | Schafer et al. | |
| 2004/0254325 | A1 | 12/2004 | Kuepfer et al. | |
| 2007/0148473 | A1 | 6/2007 | Moore et al. | |

FOREIGN PATENT DOCUMENTS

| DE | 10137855 A1 | 2/2003 |
| EP | 0250248 A2 | 12/1987 |
| EP | 1489129 A1 | 12/2004 |
| WO | 03014194 A1 | 2/2003 |
| WO | WO 2007057342 A1 * | 5/2007 |
| WO | 2007079028 A1 | 7/2007 |

* cited by examiner

*Primary Examiner* — Thao T. Tran
(74) *Attorney, Agent, or Firm* — Brooks Kushman P.C.

(57) ABSTRACT

Composites of a fluoropolymer and an organopolysiloxane/polyurethane/polyurea adhesive exhibit strong adhesion while also offering desirable handling properties.

8 Claims, No Drawings

FLUOROPOLYMER-SILICON COMPOUNDS AND METHOD FOR PRODUCTION

CROSS-REFERENCE TO RELATED APPLICATION

This application is the U.S. national phase of PCT Appln. No. PCT/EP2008/063954 filed Oct. 16, 2008 which claims priority to German application DE 10 2007 000 553.0 filed Oct. 22, 2007.

BACKGROUND OF THE INVENTION

1. Field of the Invention

The invention relates to a composite and to a process for producing the composite.

2. Description of the Related Art

Thermoplastic fluoropolymers can be processed by common thermoplastic methods, for example casting, blowing extrusion, injection molding, thermoforming, blow molding, etc. They typically possess properties such as low gas permeabilities, media resistance, low flammability, low surface energy and low coefficients of friction. Their end uses therefore range from architectural films through medical equipment to pipes and conduits for chemical apparatus construction, among others. A disadvantage of these fluoropolymers is, however, their low adhesion to chemically different substances, for example minerals such as marble, metals such as steel, or polymers such as polypropylene. This inadequate adhesion can be improved by pretreatment, for example by plasma processes, chemical etching or the use of primers, but this is generally associated with increased costs.

WO 07/079028 describes laminates composed of thermoplastic fluoroelastomers with adhesives based on organosilicone copolymers and MQ resins, which do not require the pretreatment of thermoplastic fluoropolymers. MQ resins are well known in the art and comprise monofunctional "M" siloxy units having the formula $R_3Si-O-$ ($R_3SiO_{1/2}$) and quadrifunctional "Q" siloxy units,

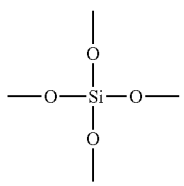

($SiO_{4/2}$) where R is an organo group. Such resins are more fully described in U.S. published application 2007/0148473, equivalent to WO 07/07928, in paragraphs [0075] to [0079]. A disadvantage of these articles and processes is that one side of the article is permanently tacky, which, especially in the case of film or roll products, for example films finished therewith, has an exceptionally unfavorable effect on the unwind behavior. In other words, the roll of the fluoropolymer finished with the adhesive can be unwound only with extreme difficulty, and even the placing on a surface to be adhesive-bonded is very complicated, specifically in the case of large areas owing to the adhesive character. To avoid this behavior, it is in turn necessary to add a further release liner in a costly and inconvenient manner, which in turn leads to increased costs and also waste.

In addition, the transparency of the PSA layer of organosilicone copolymer is reduced by use of the MQ resins. There was therefore a need for a means of finishing thermoplastic fluoropolymers in a simple manner with an adhesive layer which does not have the disadvantages just mentioned.

SUMMARY OF THE INVENTION

It has now been surprisingly found that, when the MQ resins used in WO 2007/079028 are dispensed with and the organosilicone copolymers are simultaneously modified chemically, a significantly improved material for many end uses can be obtained. These and other objects are achieved through the use of oganopolysiloxane/polyurea/polyurethane copolymer adhesives with increased organic content.

Thus, by increasing the organic content, i.e. by reducing the chain length of the siliconediamine, used to form the organopolysiloxane copolymers, an improved adhesion to fluoropolymers can be obtained, without requiring MQ resins for that purpose, which, in the case of the inventive materials, additionally results in improved optical properties such as transparency or haze.

This affords a thermoplastic fluoropolymer which is finished with a kind of hotmelt adhesive, i.e. the adhesive effect of the adhesive layer is only present in latent form and is activated only via the action of heat. This of course enormously improves the handling of the only latently tacky material.

The invention therefore provides a composite of a

I) thermoplastically processable fluoropolymer and an

II) organopolysiloxane/polyurea/polyurethane block copolymer of the general formula (1)

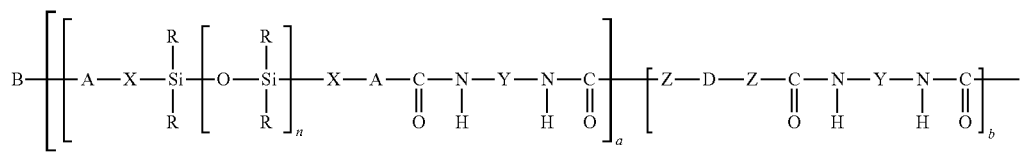

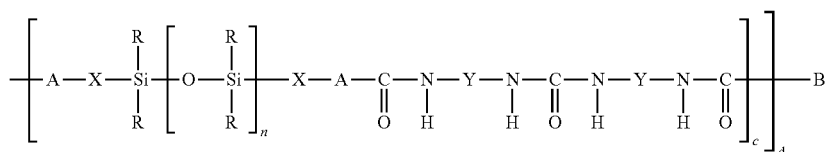

where
R is a monovalent, optionally fluorine or chlorine-substituted hydrocarbon radical having 1 to 20 carbon atoms,
X is an alkylene radical having 1 to 20 carbon atoms, in which nonadjacent methylene units may be replaced by O groups,
A is an oxygen atom or an amino group NR',
Z is an oxygen atom or an amino group NR',
R' is hydrogen or an alkyl radical having 1 to 10 carbon atoms,
Y is a divalent, optionally fluorine or chlorine-substituted hydrocarbon radical having 1 to 20 carbon atoms,
D is an optionally fluorine, chlorine, C1 C6-alkyl or C1 C6-alkyl ester-substituted alkylene radical having 1 to 700 carbon atoms, in which nonadjacent methylene units may be replaced by O, COO, OCO or OCOO groups,
B is hydrogen or a functional or nonfunctional organic or organosilicon radical,
n is from 1 to 160,
a is at least 1,
b is from 0 to 40,
c is from 0 to 30 and
d is greater than 0.
R is preferably a monovalent hydrocarbon radical having 1 to 6 carbon atoms, and is more preferably unsubstituted. Particularly preferred R radicals are methyl, ethyl, vinyl and phenyl.
X is preferably an alkylene radical having 1 to 10 carbon atoms. The alkylene radical X is preferably uninterrupted.
A is preferably an NH group.
Z is preferably an oxygen atom or an NH group.
Y is preferably a hydrocarbon radical which has 3 to 14 carbon atoms and is preferably unsubstituted. Y is preferably an aralkylene radical or linear or cyclic alkylene radical. Y is most preferably a saturated alkylene radical.
D is preferably an alkylene radical having at least 2 and more preferably at least 4 carbon atoms, and at most 12 carbon atoms. D is likewise preferably a polyoxyalkylene radical, more preferably a polyoxyethylene radical or polyoxypropylene radical, having at least 20 and preferably at least 100 carbon atoms, and at most 800 and preferably at most 200 carbon atoms. The D radical is preferably unsubstituted.
n is preferably at least 3, more preferably at least 25, and preferably at most 140, more preferably at most 100, and most preferably at most 60.
a is preferably at most 50.
When b is not 0, b is preferably at most 50, more preferably at most 25.
c is preferably at most 10, more preferably at most 5.
The use of chain extenders, in particular chain extenders such as dihydroxyl compounds or water, in addition to the urea groups, can achieve a significant improvement in mechanical properties. It is thus possible to obtain materials whose mechanical properties are entirely comparable to conventional silicone rubbers, but have an increased transparency, and into which no additional active filler, for example MQ resins, need be incorporated in order to ensure sufficient tackiness.
The chain extenders preferably have the general formula (6)

$$HZ-D-ZH$$

where D and Z are each as defined above. If Z is defined as O, the chain extender of the general formula (6) can also, before the reaction, be reacted in a preliminary stage with diisocyanate of the general formula (5)

$$OCN-Y-NCO$$

where
Y is a divalent, optionally fluorine- or chlorine-substituted hydrocarbon radical having 1 to 20 carbon atoms.
Preferably at least 50 mol %, more preferably especially at least 75 mol %, of urea groups are present in the copolymer of the general formula (1), based on the sum of the urethane and urea groups.
Examples of the diisocyanates of the general formula (5) are preferably aliphatic compounds such as isophorone diisocyanate, hexamethylene 1,6-diisocyanate, tetramethylene 1,4-diisocyanate and methylenedicyclohexyl 4,4'-diisocyanate, or aromatic compounds such as methylenediphenyl 4,4'-diisocyanate, 2,4-toluene diisocyanate, 2,5-toluene diisocyanate, 2,6-toluene diisocyanate, m-phenylene diisocyanate, p-phenylene diisocyanate, m-xylene diisocyanate, tetra-methyl-m-xylene diisocyanate or mixtures of these isocyanates. Examples of commercially available compounds are the diisocyanates of the DESMODUR® series (H,I,M,T,W) from Bayer AG, Germany. Preference is given to aliphatic diisocyanates in which Y is a saturated alkylene radical, since these lead to materials which exhibit improved UV stabilities, which is advantageous in the case of outdoor use of the polymers.
The α,ω-OH-terminated alkylenes of the general formula (6) are preferably polyalkylenes or polyoxyalkylenes. These are preferably substantially free of contamination by monofunctional, trifunctional or higher-functionality polyoxyalkylenes. It is preferable to use polyetherpolyols, polytetramethylenediols, polyesterpolyols, and polycaprolactonediols, as well as α,ω-OH-terminated polyalkylenes based on polyvinyl acetate, polyvinylacetate-ethylene copolymers, polyvinyl chloride copolymers, and polyisobutylenediols. Preference is given to using polyoxyalkylenes, particular preference to using polypropylene glycols. Such compounds are commercially available with molecular weights Mn up to more than 10,000 as base materials, inter alia, for flexible polyurethane foams and for coating applications. Examples thereof are the BAYCOLL® polyetherpolyols and polyesterpolyols from Bayer AG, Germany, or the Acclaim® polyetherpolyols from Lyondell Inc., USA. It is also possible to use monomeric α,ω-alkylenediols such as ethylene glycol, propanediol, butanediol or hexanediol. In addition, dihydroxyl compounds are likewise understood in the context of the invention to mean bishydroxyalkylsilicones, as sold, for example, by Goldschmidt under the Tegomer H—Si 2111, 2311 and 2711 names.
The polydiorganosiloxane-urea copolymers of the general formula (1) exhibit high molecular weights and good mechanical properties coupled with good processing properties.
The thermoplastically processable fluoropolymer possesses, as a substructure, one or more units of the —$CH_2$—$CFX'$ structure, where X' may be H, Cl, F or a perfluorinated organic radical. The particular substructure may be equivalent to a repeat unit of the polymer. The fluoropolymers may either be fully fluorinated, for example PFA, MFA or FEP polymers, or partly fluorinated, for example in the case of ETFE; HTE; EFEP; PVDF; PVF; ETFE; ECTFE or THV polymers. Examples of inventive fluoropolymers are polyvinylidene fluorides (brand names including TEDLAR® from DuPont®, KYNAR® from ARKEMA®), polyvinyl fluorides, tetrafluoro-ethylene-ethylene copolymers (e.g. ET 6210J, ET 6235, ET 6240 from DYNEON, Burgkirchen), hexafluoropropene-vinylidene fluoride copolymers (e.g. DAIEL T-530 from DAIKIN) and other products mentioned in WO 2007/079028.

Particular preference is given to tetrafluoroethylene-hexafluoropropylene copolymers (FEP) or else ethylene-tetrafluoroethylene-hexafluoropropylene copolymers (EFEP or HTE) or tetrafluoroethylene-ethylene copolymers (ETFE).

The fluorine content of the thermoplastic fluoropolymer should preferably be at least 15% by weight.

The thickness of the thermoplastically processable fluoropolymer is preferably between 1 and 2000 µm, more preferably between 10 and 500 µm and most preferably between 25 and 150 µm.

The thickness of the organosiloxane copolymer is preferably between 1 and 2000 µm, more preferably between 20 and 1000 µm and most preferably between 100 and 800 µm. The transparency of the film composite is preferably greater than 80%, more preferably greater than 85% and most preferably greater than 90% (the maximum achievable transparency in measurements may be 92% owing to reflection losses).

The layer of thermoplastic fluoropolymer may consist of a polymer, of a polymer blend of different fluoro-polymers or else of several layers of different fluoro-polymers.

The layer of siloxane-urea-urethane copolymer may consist of a polymer, of a polymer blend of different siloxane-urea-urethane copolymers, or a plurality of layers of different siloxane-urea-urethane copolymers.

It is additionally preferable for thermostabilizers, UV stabilizers, dies or HALS additives to be incorporated into the inventive thermoplastic materials.

The above-described silicone copolymers of the general formula (1) can be prepared either in solution or in solid substance (i.e. neat), continuously or batchwise, according to DE 10137855 or EP 250248. What is essential is that there is optimal and homogeneous mixing of the constituents for the selected polymer mixture under the reaction conditions, and any phase incompatibility is prevented by solubilizers. The preparation depends on the solvent used. When the proportion of the rigid segments such as urethane or urea units is high, it may be necessary to select a solvent with a high solubility parameter, for example dimethylacetamide. For most syntheses, THF has been found to be sufficiently suitable.

All constituents are preferably dissolved in an inert solvent. Particular preference is given to a synthesis without solvent.

For the reaction without solvent, the homogenization of the mixture is of crucial significance in the reaction. In addition, the polymerization can also be controlled by the selection of the reaction sequence in a staged synthesis.

For better reproducibility, the preparation should generally and preferably be effected with exclusion of moisture and under protective gas, typically nitrogen or argon.

The reaction is preferably effected without catalyst, but may also, as usual in the preparation of polyurethanes, be effected by adding a catalyst. Suitable catalysts for the preparation are preferably dialkyltin compounds, for example dibutyltin dilaurate, dibutyltin diacetate, or tertiary amines, for example N,N-dimethylcyclohexanamine, 2-dimethylaminoethanol, 4-dimethylaminopyridine.

The thermoplastic fluoropolymers can be prepared by the known methods.

The invention further provides the production of a composite, wherein the composite is performed by coextrusion of I and II in coextrusion dies.

The film composite can be produced either by thermal lamination of one or more films of thermoplastic fluoropolymers with one or more films of an inventive organosilicone copolymer, or by coextrusion of melts of one or more thermoplastic fluoropolymers with one or more melts of an inventive organosilicone copolymer, the polymer melts being obtained either by melting of polymer pellets or by direct reactive extrusion in a suitable reactor.

Subsequently, the melts of the thermoplastics are combined layer by layer in a suitable die, and then cooled after emerging from the die and treated further according to the prior art (cut, surface-structured, etc.).

The coextrusion of polymer melts is preferably performed in what are known as feedblock dies or coextrusion dies, or a combination of the two die types. Very particular preference is given to performing the coextrusion in coextrusion dies.

Optionally, the inventive composite can also be produced by extruding an organosilicone copolymer onto an already produced fluoropolymer film, in which case the polymer melts are obtained either by melting polymer pellets or by direct reactive extrusion in a suitable reactor. Similarly, the composite can also be produced by extruding a fluoropolymer onto an already produced organosilicone copolymer film.

The invention further provides a composite body which comprises an inventive composite.

The inventive composite body preferably has a glass transition temperature (Tg) of less than −40° C. and preferably has a transparency greater than 80%, preferably greater than 85% and more preferably greater than 90%.

Owing to the high transparency, the inventive composites may also find use as light guide materials, for example optical fibers.

The inventive film composites may find use as a coating material for corrosive metals (steel), in the architectural sector, for covering minerals such as marble or granite, or else for covering solar modules.

Since the inventive composites have relative permittivities of less than 4 As/(Vm), preferably of less than 3 As/(Vm), the use of the laminates in electrical or electronic applications is particularly preferred.

All of the above symbols in the above formulae are each defined independently of one another.

In the examples which follow, unless stated otherwise in the particular case, all amount and percentage data are based on weight and all pressures are 0.10 Mpa (abs.). All viscosities were measured at 20° C. The molecular weights were determined by means of GPC in toluene (0.5 ml/min) at 23° C. (column: PLgel Mixed C+PLgel 100 A, detector: RI ERC7515).

Materials used:
Isocyanate 1: methylenebis(4-isocyanatocyclohexane), Desmodur W from Bayer
Isocyanate 2: isophorone diisocyanate, Desmodur I from Bayer
Silicone oil 3: bisaminopropyl-terminated polydimethyl-siloxane (2900 g/mol) from Wacker Silicones (FLUID NH 40 D)
Fluoropolymer film 4: ET-6235 (200 µm) from Nowoflon (ethylene-tetrafluoroethylene copolymer, ETFE)
Fluoropolymer film 5: EFEP-RP 5000 (200 µm) from Nowoflon (ethylene-hexafluoropropene copolymer, EFEP)
Fluoropolymer film 6: FEP-CT1S (100 µm) from Norton (tetrafluoroethylene-hexafluoropropene copolymer, FEP)
Fluoropolymer film 7: Isoclar 0711 (290 µm) from Isovolta (polyvinylidene fluoride, PVF)
Fluoropolymer film 8: Isoclar T2754 (100 µm) from Isovolta (ethylene-tetrafluoroethylene copolymer, ETFE)

EXAMPLE 1

In a twin-shaft kneader from Collin, Ebersberg, with 6 heating zones, under a nitrogen atmosphere, the diisocyanate was metered into the first heating zone and the aminopropyl-terminated silicone oil into the second heating zone. The temperature profile of the heating zones was programmed as follows: zone 1 30° C., zone 2 140° C., zone 3 160° C., zone 4 185° C., zone 5 185° C., zone 6 180° C. The speed was 150 rpm. The diisocyanate (methylenebis(4-isocyanatocyclohexane)) was metered into zone 1 at 1330 mg/min, and the amine oil (2900 g/mol) was metered into zone 2 at 15 g/min. At the die of the extruder, a polydimethylsiloxane-polyurea block copolymer with a molecular weight of 82 000 g/mol and an MVR (21.6 kg, 180° C.) of 63 was obtained, and was subsequently pelletized.

EXAMPLE 2

In a twin-shaft kneader from Collin, Ebersberg, with 6 heating zones, under a nitrogen atmosphere, the diisocyanate was metered into the first heating zone and the aminopropyl-terminated silicone oil into the second heating zone. The temperature profile of the heating zones was programmed as follows: zone 1 30° C., zone 2 140° C., zone 3 160° C., zone 4 175° C., zone 5 180° C., zone 6 170° C. The speed was 150 rpm. The diisocyanate (isophorone diisocyanate) was metered into zone 1 at 1150 mg/min, and the amine oil (2900 g/mol) was metered into zone 2 at 15 g/min. At the die of the extruder, a polydimethylsiloxane-polyurea block copolymer with a molecular weight of 156 000 g/mol and an MVR (21.6 kg, 180° C.) of 178 was obtained, and was subsequently pelletized.

EXAMPLES 3 to 6

The pellets produced in examples 1 and 2 were used to produce, on a film extruder from Collin, Ebersberg, films which had a width of 60 mm and a thickness of approx. 250 µm or 500 µm.

| | Material | Zone 1 | Zone 2 | Zone 3 | Zone 4 | Film thickness |
|---|---|---|---|---|---|---|
| Example 3 | Example 1 | 150° C. | 180° C. | 200° C. | 195° C. | 489 µm |
| Example 4 | Example 1 | 150° C. | 180° C. | 200° C. | 195° C. | 244 µm |
| Example 5 | Example 2 | 150° C. | 180° C. | 190° C. | 185° C. | 512 µm |
| Example 6 | Example 2 | 150° C. | 180° C. | 190° C. | 185° C. | 230 µm |

EXAMPLES 7-20

The films of the organosiloxane copolymers produced in examples 3-6 were laminated with different thermoplastic fluorofilms at different temperatures and pressures. Subsequently, the adhesion was determined by means of a 180° peeling test.

Fluoropolymer film 4: ET-6235 (200 µm) from Nowoflon (ETFE)
Fluoropolymer film 5: EFEP-RP 5000 (200 µm) from Nowoflon
Fluoropolymer film 6: FEP-CT1S (100 µm) from Norton (FEP)
Fluoropolymer film 7: Isoclar 0711 (290 µm) from Isovolta (PVF)
Fluoropolymer film 8: Isoclar T2754 (100 µm) from Isovolta (ETFE)

| Example | Silicone film | Fluoropolymer film | Temperature | Pressure [MPa] | Lamination time | 180° test, N/cm |
|---|---|---|---|---|---|---|
| 7 | Example 3 | Film 4 | 140 | 1.5 | 15 min | 13.3 |
| 8 | Example 3 | Film 4 | 150 | 1.5 | 15 min | 18.3 |
| 9 | Example 3 | Film 4 | 155 | 1.5 | 15 min | 21.5 |
| 10 | Example 3 | Film 4 | 160 | 1.5 | 15 min | 24.3 |
| 11 | Example 3 | Film 4 | 155 | 1.0 | 15 min | 20.4 |
| 12 | Example 3 | Film 4 | 155 | 0.5 | 15 min | 17.3 |
| 13 | Example 3 | Film 4 | 155 | 0.5 | 10 min | 16.2 |
| 14 | Example 3 | Film 5 | 155 | 1.5 | 10 min | 19.6 |
| 15 | Example 3 | Film 6 | 155 | 1.5 | 15 min | 18.4 |
| 16 | Example 3 | Film 7 | 155 | 1.5 | 15 min | 23.3 |
| 17 | Example 3 | Film 8 | 155 | 1.5 | 15 min | 31.8 |
| 18 | Example 4 | Film 4 | 155 | 0.5 | 10 min | cohesion fracture (~17 N/cm) |
| 19 | Example 5 | Film 4 | 155 | 1.5 | 15 min | 23.4 |
| 20 | Example 6 | Film 4 | 155 | 0.5 | 10 min | cohesion fracture (~17 N/cm) |

EXAMPLE 21

On a flat film coextrusion system from Dr. Collin, Ebersberg, an ETFE EP 7000 from Daikin and the polymer pellets from example 1 were melted in separate single-screw extruders and combined to a coextrudate by means of a coextrusion die, cooled and rolled up. The layer thickness of the fluoropolymer was 93 µm and the layer thickness of the organosilicone copolymer from example 1 was 323 µm.

The 180° peel adhesion of the silicone layer on the fluoropolymer was 14.3 N/cm.

EXAMPLE 22

The dielectric constant and the transparency were determined on different film laminates.

| Example | Laminate | Rel. permittivity (23° C., 20 kHz) [AS/Vm] | Transparency [transmission of 400-800 nm in %] |
|---|---|---|---|
| 22 | Example 10 | 2.6 | 91.5 |
| 23 | Example 14 | 2.6 | 91.6 |
| 24 | Example 15 | 2.6 | 91.3 |
| 25 | Example 16 | 2.7 | 0 |
| 26 | Example 17 | 2.6 | 89.3 |
| 27 | Example 19 | 2.6 | 91.7 |

The invention claimed is:

1. A composite of a laminate comprising adjoining layers of
I) a thermoplastically processable fluoropolymer and
II) an organopolysiloxane/polyurea/polyurethane block copolymer comprising units of the formula (1)

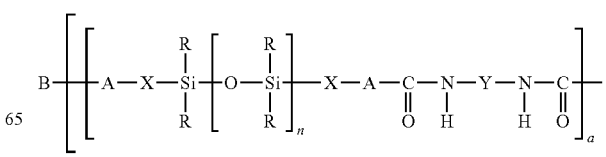

-continued

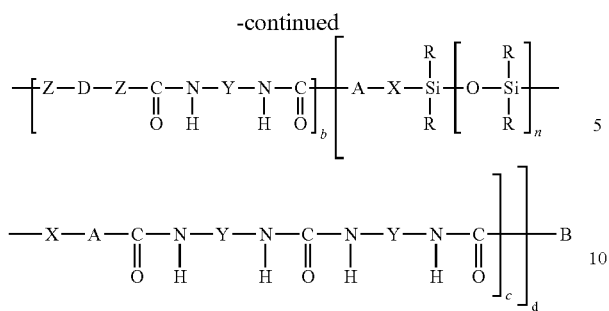

where
- R is a monovalent, optionally fluorine or chlorine-substituted hydrocarbon radical having 1 to 20 carbon atoms,
- X is an alkylene radical having 1 to 20 carbon atoms, in which nonadjacent methylene units are optionally replaced by —O— groups,
- A is an oxygen atom or an amino group —NR'—,
- Z is an oxygen atom or an amino group —NR'—,
- R' is hydrogen or an alkyl radical having 1 to 10 carbon atoms,
- Y is a divalent, optionally fluorine- or chlorine-substituted hydrocarbon radical having 1 to 20 carbon atoms,
- D is an optionally fluorine-, chlorine-, $C_1$-$C_6$-alkyl or $C_1$-$C_6$-alkyl ester-substituted alkylene radical having 1 to 700 carbon atoms, in which nonadjacent methylene units are optionally replaced by —O—, —COO—, —OCO— or —OCOO— groups,
- B is hydrogen or a functional or nonfunctional organic or organosilicon radical,
- n is from 1 to 160,
- a is at least 1,
- b is from 0 to 40,
- c is from 0 to 30 and
- d is greater than 0 and with the proviso that no tackifying MQ resin comprising monofunctional M siloxy units $R_3SiO_{1/2}$ where R is an organo group and quandrifunctional Q siloxy units $SiO_{4/2}$, is present.

2. The composite of claim 1, wherein the organopolysiloxane/polyurea/polyurethane block copolymer of formula (1) contains a chain extender selected from the group consisting of diamines, isocyanate-blocked hydroxyl compounds, dihydroxyl compounds, and mixtures thereof.

3. A composite body comprising a composite laminate of claim 1.

4. The composite body of claim 3, wherein the glass transition temperature (Tg) is less than −40° C. and the transparency is greater than 80%.

5. The composite body of claim 4, wherein the relative permittivity is less than 4 AS/(Vm).

6. A light guide comprising a composite of claim 1.

7. A process for the production of a composite of claim 1, comprising coextruding the composite by coextrusion of I and II in a coextrusion die.

8. A process for the production of a composite of claim 2, comprising coextruding the composite by coextrusion of I and II in a coextrusion die.

* * * * *